(12) United States Patent
Warren (10) Patent No.: US 6,474,058 B1
(45) Date of Patent: Nov. 5, 2002

(54) WARREN CYCLE ENGINE

(76) Inventor: Edward Lawrence Warren, 3912 Snowy Egret Dr., West Melbourne, FL (US) 32904

( * ) Notice: Subject to any disclaimer, the term of this patent is extended or adjusted under 35 U.S.C. 154(b) by 0 days.

(21) Appl. No.: 10/036,211

(22) Filed: Jan. 4, 2002

(51) Int. Cl.[7] ................................................ F02C 5/00
(52) U.S. Cl. ............................ 60/39.6; 60/512; 60/515
(58) Field of Search ........................ 60/39.6, 508, 512, 60/515, 526

(56) References Cited

U.S. PATENT DOCUMENTS

| | | | | |
|---|---|---|---|---|
| 4,074,533 A | * | 2/1978 | Stockton ....................... | 60/620 |
| 4,077,221 A | | 3/1978 | Maeda .......................... | 60/650 |
| 4,511,805 A | * | 4/1985 | Boy-Marcotte et al. ..... | 290/1 R |

* cited by examiner

Primary Examiner—Hoang Nguyen (57) ABSTRACT

This is the mechanization of an external combustion hot air engine cycle known as the "Warren Cycle". The "Warren Cycle" has four parts. They are: 1. cooled compression; 2. stored heat released from a regenerator and heat added to the working fluid at constant volume; 3. heated expansion; and 4. heat stored in a regenerator and heat removed from the working fluid at constant volume. The resulting engine is a thermally regenerated, reciprocating, two stroke external combustion engine that stores the spent heat in regenerator 10 and returns it to the engine cycle to do work. Each unit of the engine has cylinder 12 that is closed at one end by cylinder head 4 and contains working fluid, regenerator 10, heater 14, cooler 24, and power piston 18 that is connected to power output shaft 22. Cooler 24 is moved through the working fluid as it is being compressed, cooling the working fluid. Regenerator 10 and heater 14 are moved through the working fluid, heating the working fluid, while its volume is kept constant. Heater 14 is moved through the working fluid while it is expanding, heating the working fluid. Regenerator 10 and cooler 24 are moved through the working fluid, cooling the working fluid, while the volume of the working fluid is kept constant.

20 Claims, 8 Drawing Sheets

WARREN CYCLE ENGINE

BACKGROUND

1. Field of Invention

The present invention relates to mechanization of the "Warren Cycle". The "Warren Cycle" is: cooled compression, stored heat released from a regenerator and heat added to the working fluid at constant volume, heated expansion, and heat stored in a regenerator and heat removed from the working fluid at constant volume. The resulting engine is a thermally regenerated, reciprocating, two stroke external combustion engine that stores the spent heat and returns it to the engine cycle to do work.

2. Description of Prior Art

Thermal regeneration is the capturing of waste heat from a thermodynamic cycle, and the utilization of that energy within the cycle or engine to improve the cycle or engine's performance. This is commonly done with many heat engines including Stirling engines, gas turbines, and Rankine cycle devices. In the Stirling cycle engine, the fluid is moved about in the engine by a displacer piston or a regenerator acting as a displacer piston. In a gas turbine the exhaust heat coming out of the exhaust is transferred to the fluid leaving the compressor and going into the combustor. This way it is not necessary to add as much heat (fuel) in the combustor to raise the fluid temperature to the desired turbine inlet temperature. This means that the same work is accomplished but less fuel is used.

The approach taken by most inventors who attempted to incorporate regeneration into reciprocating external combustion engines was to try to improve existing cycles. In the gas turbine and Brayton cycles, heat is added at constant pressure. This results in a pressure difference across the regenerator that must be sealed. The gas turbines use high speed rotating devices that are costly. The piston type Braton engines need valves in the high temperature working fluid paths. The Stirling cycle engines use a displacer piston or a regenerator that acts as a displacer piston. They also have difficulty getting the heat from the heater into the working fluid and from the working fluid into the cooler. They also have problems timing the heating and cooling with the position of the power piston.

The Warren cycle engine is a piston engine. It has no high speed rotating parts. Heat is added at constant volume. There is a slight pressure difference across the regenerator that requires minimum sealing. The Warren cycle engine has no displacer piston, and the regenerator does not act like a displacer piston. In addition, the engine moves the fluid to be heated through the regenerator, heater, or cooler each time the fluid is to be heated or cooled. The Warren cycle engine has perfect timing between the power piston position and when heat is added or removed. Other differences exist between the engines and the regenerated engine disclosed herein. All of these are discussed in greater detail in the section entitled "Detailed Description of the Invention".

SUMMARY

This invention is a two stroke, regenerated, external combustion, reciprocating engine made up of a number of similar working units. Each working unit is comprised of a cylinder that is closed at one end by a cylinder head and contains a heater, cooler, regenerator, and a power piston that is connected to a power output means. The regenerator, heater, and cooler can move between the power piston and the cylinder head, and means are provided to accomplish this movement at the appropriate times during the engine's operating cycle. The regenerator is an alternating flow heat exchanger. The movement of the regenerator, heater, and cooler is such that the cooling stroke (the regenerator is heating) begins when the power piston is at about 85% of the way from the cylinder head, and ends when the power piston is about 15% of the way towards the cylinder head. (This is cooling at constant volume). The compressed fluid heating stroke (the regenerator is giving up heat) begins at about 85% of the power piston's stroke towards the cylinder head, and ends at about 15% of downward travel of the power piston's expansion stroke. (This is heating at constant volume). Means are provided for the introduction of heat into the working fluid during the heating and expansion cycles. Means are provided for the removal of heat from the working fluid during the cooling and compression cycles.

Objects and Advantages

Several objects and advantages of the Warren cycle engine are:

(a) The engine compresses the fluid in the same cylinder that the engine expands the fluid in.
(b) The engine cools the fluid during compression.
(c) The engine saves the heat from the spent fluid and releases the heat to the compressed fluid.
(d) The engine has no valves.
(e) The engine has no displacer piston
(f) The heater supply and exit pipes can be sized so that there is no compression during the heating cycle.
(g) The engine can be operated so that the charge is almost fully expanded.

DRAWING FIGURES

FIGS. 1–4 are schematic illustrations of the preferred embodiment of a "Warren Cycle Engine".

FIGS. 5–8 are schematic illustrations of the first alternate embodiment of a "Warren Cycle Engine".

REFERENCE NUMERALS IN DRAWINGS 4 cylinder head
7 shaft
10 regenerator
12 cylinder
14 heater
16 heat source
18 power piston
20 connecting rod
22 power output shaft 24 cooler
25 regenerator actuator
26 heater actuator
27 cooler actuator
28 heater fluid supply pipe
30 heater fluid exit pipe
32 cooler fluid supply pipe
34 cooler fluid exit pipe
36 cold source

DESCRIPTION

FIGS. 1 to 4—Preferred Embodiment

This invention is a two stroke regenerative, reciprocating, external combustion engine employing a regenerator 10, heater 14, and cooler 24. The preferred embodiment of this invention employs two strokes divided into four cycles. The first cycle is the cooling cycle. The second is the compression cycle. The third is the heating cycle. And the fourth is the expansion cycle. The cooling cycle is from about 85% of the downward travel of power piston 18 to about 15% of the travel back up. The compression cycle is from about 15% of the travel back up of power piston 18 to about 85% of the upward travel of power piston 18. The heating cycle is from about 85% of the upward travel of power piston 18 to about 15% of the downward travel of power piston 18. The expansion cycle is from about top dead center to about 85% of the downward travel of power piston 18. The above positions are all estimates and are given for descriptive purposes only. The actual position, at which a part of the cycle may begin or end, may be different from those set out above. (Heater fluid supply and exit pipes can be sized such that no mechanical compression takes place during regenerative heating). The heating and expansion cycles can overlap.

The cooling cycle begins with regenerator 10, and cooler 24 adjacent to cylinder head 4 and ends with regenerator 10, heater 14, and cooler 24 adjacent to power piston 18. During the cooling cycle, regenerator 10, and cooler 24 move down (towards power piston 18) forcing the hot fluid through regenerator 10, and regenerator 10 absorbs heat from the fluid (cooling the fluid).

The compression cycle starts with regenerator 10, heater 14, and cooler 24 close to and moving up with power piston 18 and ends with regenerator 10, and heater 14 moving away from power piston 18, and cooler 24 adjacent to cylinder head 4.

The heating cycle starts with regenerator 10 and heater 14 moving away from power piston 18, and ends with regenerator 10, heater 14, and cooler 24 adjacent to cylinder head 4. During the heating cycle regenerator 10 and heater 14 are moved up through the fluid trapped between power piston 18 and cylinder head 4 and transfer heat to this fluid (heating the fluid). Air is the fluid that is expected to be employed in this invention. However, any gas, liquid or mixture of gas and liquid could be used.

FIGS. 1–8 Illustrate schematically an external combustion engine suitable for practice of this invention. Only one set of components for such an engine is illustrated; however, what is illustrated will function as a complete engine if it has an inertial load. It will be understood that this is merely representative of one set of components. A plurality of such structures joined together would make up a larger engine. Other portions of the engine are conventional. Thus, the bearings, seals, etc. of the engine are not specifically illustrated. The power output shaft is but one means of power output. The power pistons of two cylinders placed end to end could have a linear electrical generator between them, and the engine operated as a free piston engine.

Cylinder 12 is closed at one end by cylinder head 4. Cylinder 12 further contains power piston 18, which is connected to power output shaft 22 by a connecting rod 20 (for converting the linear motion of the piston to the rotating motion of the shaft). The expanding gases exert a force on power piston 18, (a cylindrical piston that can move up and down in cylinder 12). That force, exerted on power piston 18 moving it down, is transmitted via connecting rod 20 and power output shaft 22 to a load (not shown). Heater fluid supply pipe 28 transfers hot fluid to heater 14 from heat source 16, and heater fluid exit pipe 30 transfers spent fluid from heater 14 back to heat source 16. Cooler fluid supply pipe 32 transfers cold fluid to cooler 24 from cold source 36, and cooler fluid exit pipe 34 transfers spent fluid from cooler 24 back to cold source 36. Heater actuator 26 moves heater 14, and cooler actuator 27 moves cooler 24. Heater fluid supply pipe 28, heater fluid exit pipe 30, cooler fluid supply pipe 32 and cooler fluid exit pipe 34 have sections that slide by one another like sections of a small telescope. Flexible pipes could be used instead of the telescoping sections.

There are many ways, such as cams and springs, to move regenerator 10, heater 14, and cooler 24, but for ease of explanation, actuators 26, and 27 will move regenerator 10, heater 14, and cooler 24.

Regenerator 10, heater 14, and cooler 24 move back and forth (down and up) between cylinder head 4 and power piston 18 parallel to the axis of the cylinder. When heater 14 is moving down it allows fluid to move from the space below heater 14, and above power piston 18 through heater 14 into the space between heater 14 and regenerator 10. When regenerator 10 and cooler 24 are moving down they allow fluid to move from the space below regenerator 10, and above heater 14 through regenerator 10 and cooler 24 into the space between cooler 24 and cylinder head 4. When cooler 24 moves up it allows fluid to move from the space between cooler 24 and cylinder head 4 through cooler 24 into the space below cooler 24 and above regenerator 10. When regenerator 10, and heater 14 move up they allow fluid to move from the space between cooler 24 and regenerator 10 through regenerator 10 and heater 14 into the space below heater 14, and above power piston 18. Regenerator 10 is made from a permeable material such that when regenerator 10 moves down and the fluid flows through it, the material absorbs heat from the fluid. When regenerator 10 moves up, the permeable material gives up heat to the compressed fluid.

The means to move regenerator 10, heater 14, and cooler 24 are actuators 26, and 27. Other means can be used to move regenerator 10, heater 14, and cooler 24, such as a push rod, and a rocker arm (not shown). These other means can be applied from above or below power piston 18. The means can be hydraulic, pneumatic, electrical, mechanical, or any combination of them that will move regenerator 10, heater 14, and cooler 24 as required.

FIGS. 1 to 4—Operation of Preferred Embodiment

The engine operates as follows:

Heater fluid comes from heat source 16, goes to heater 14, and returns to heat source 16 during the heating cycle and the expansion cycle. Cooler fluid comes from cold source 36, goes to cooler 24, and returns to cold source 36 during the cooling cycle and the compression cycle.

Figure 1:
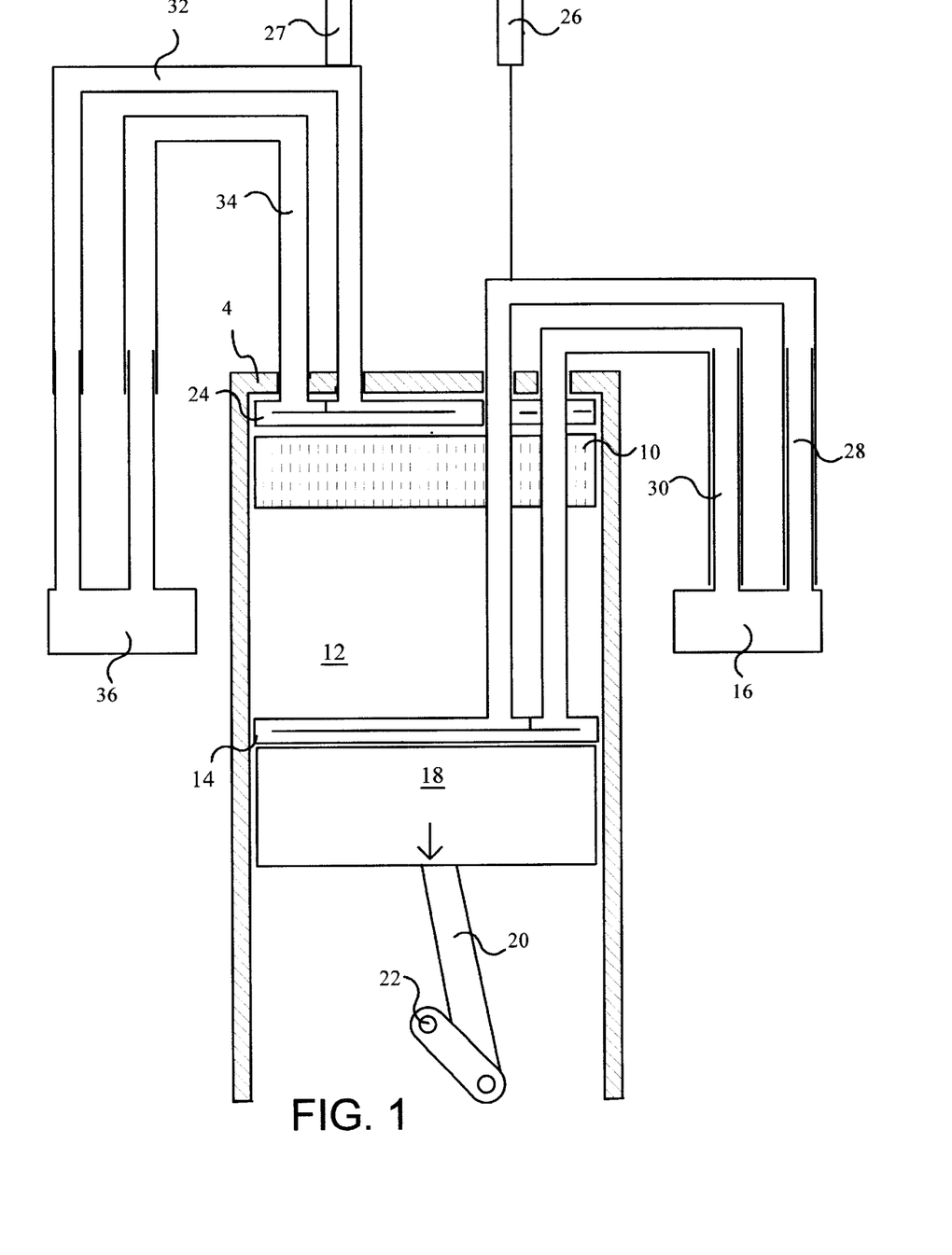
FIG. 1 shows the engine at the start of the cooling cycle.
Figure 4:
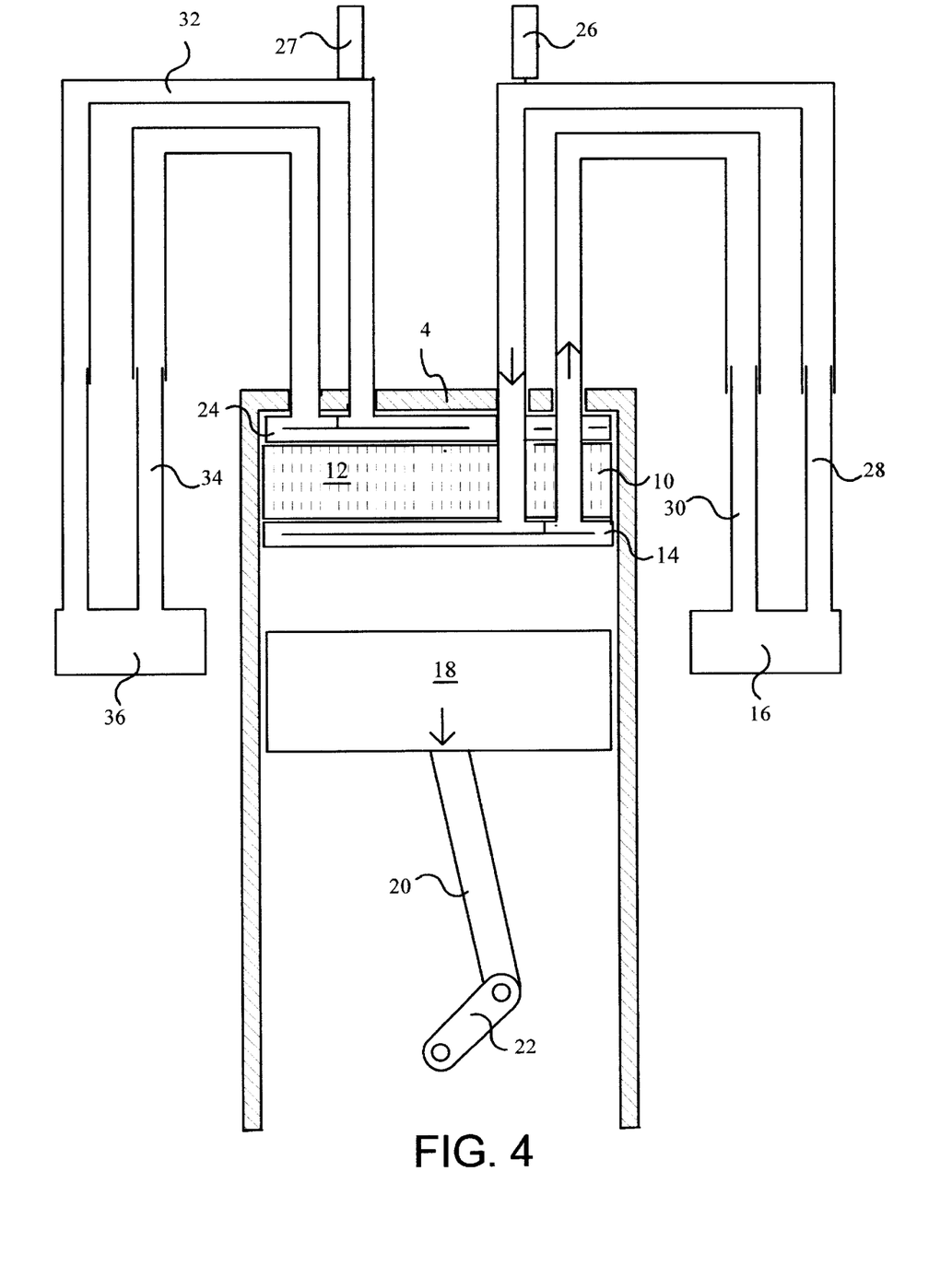
FIG. 4 shows the engine at the start of the expansion part of the cycle.

Before FIG. 1 (Between FIG. 4 and FIG. 1)

The expanding fluid acting on power piston 18 moves power piston 18 down to about 85% of it's downward travel and delivers power output.

Heating fluid comes from heat source 16, goes to heater 14, and returns to heat source 16.

After power piston 18 has moved about a third of it's way down, cooler 24 moves down, and catches up with power piston 18 at about 85% of power piston 18's downward travel.

In FIG. 1

Power piston 18 is at about 85% of it's downward travel.
Regenerator 10, and cooler 24 start to move down.

Figure 2:
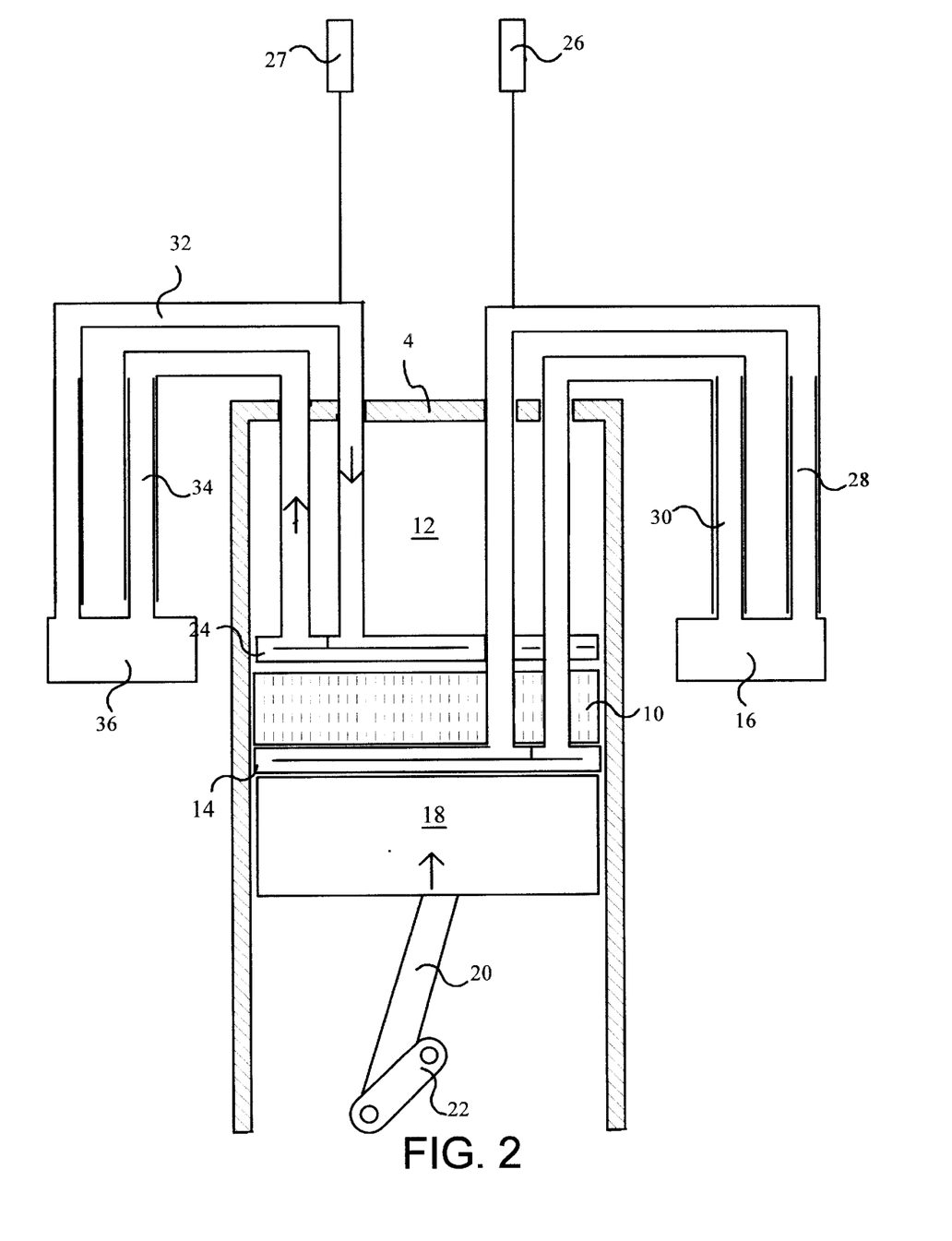
FIG. 2 shows the engine at the start of the compression cycle

Between FIG. 1 and FIG. 2

Regenerator 10, and cooler 24 continue to move down.
Cooler fluid comes from cold source 36, goes to cooler 24, and returns to cold source 36.
The working fluid going through regenerator 10 heats up regenerator 10; and regenerator 10, and cooler 24 cool the working fluid.
Power piston 18 starts back up.

In FIG. 2

Power piston 18, heater 14, regenerator 10, and cooler 24 are close to one another.
Cooler fluid comes from cold source 36, goes to cooler 24, and returns to cold source 36.

Figure 3:
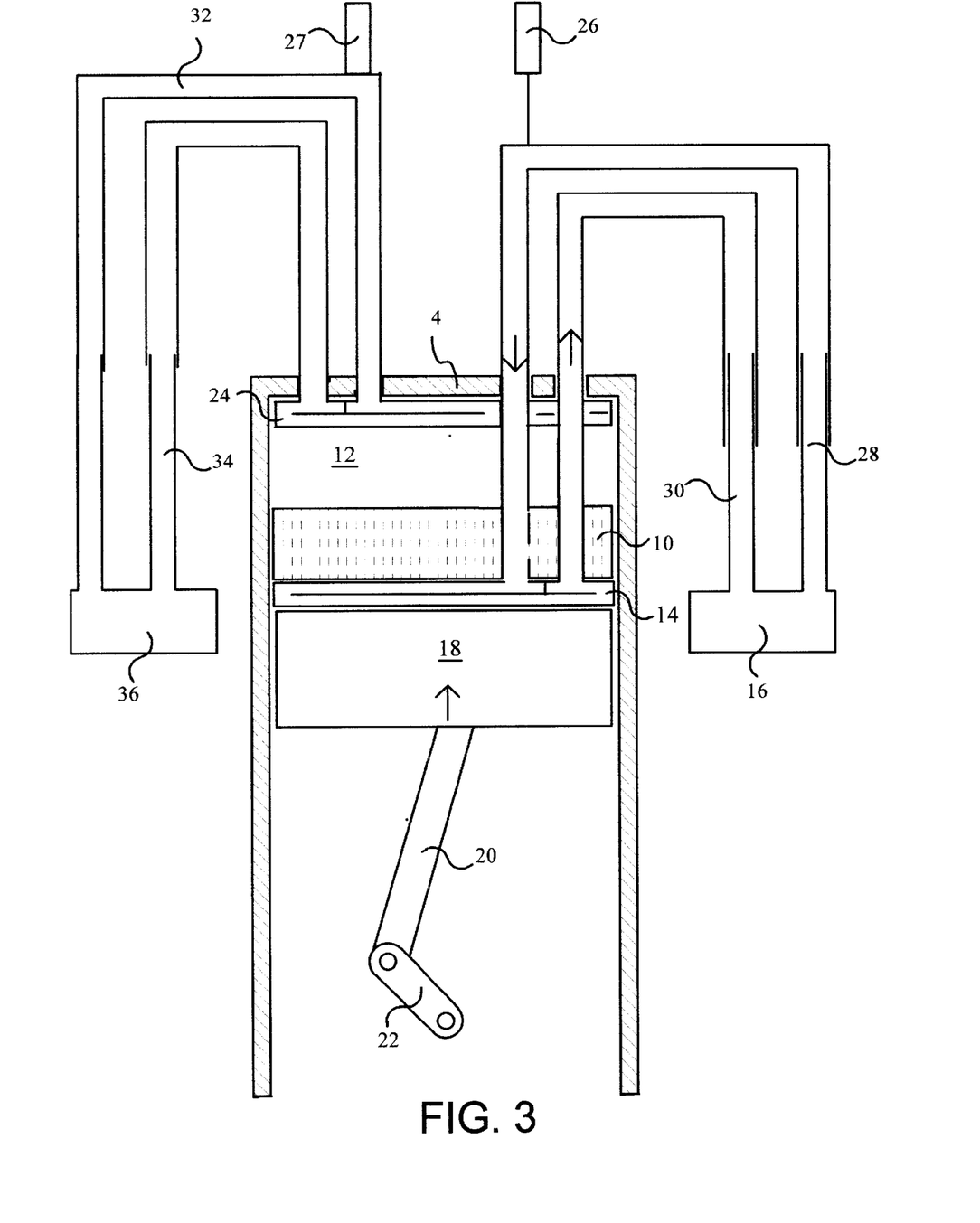
FIG. 3 shows the engine at the start of the heating cycle.

Between FIG. 2 and FIG. 3

Cooler fluid comes from cold source 36, goes to cooler 24, and returns to cold source 36.
Cooler 24 moves up to cylinder head 4, and cools the working fluid that passes through it.
Power piston 18, regenerator 10 and heater 14 move up together to about 85% of power piston's 18 upward travel.
Power piston 18 moving upwards compresses the working fluid in cylinder 12.

In FIG. 3

Heater fluid comes from heat source 16, goes to heater 14, and returns to heat source 16.
Power piston 18, regenerator 10, and heater 14, are at about 85% of the upward travel of power piston 18.
Cooler 24 is next to cylinder head 4.

Between FIG. 3 and FIG. 4

Heater fluid comes from heat source 16, goes to heater 14, and returns to heat source 16.
Regenerator 10 and heater 14 move away from power piston 18 and up against cooler 24.
As regenerator 10 and heater 14 move up toward cooler 24, the compressed working fluid moves through heater 14 and regenerator 10 and cools regenerator 10; and heater 14 and regenerator 10 heat up the working fluid.

In FIG. 4

Heater fluid comes from heat source 16, goes to heater 14, and returns to heat source 16.
Cooler 24, regenerator 10, and heater 14 are up against cylinder head 4.
Hot expanding fluid is pushing power piston 18 down.
The cycle repeats.

Important Features

The volume of the working fluid between regenerator 10 and cooler 24 can be adjusted by sizing heater fluid supply pipe 28 and heater fluid exit pipe 30 so that when regenerator 10 and heater 14 move away from power piston 18 no mechanical compression takes place even though power piston 18 continues to move up before it starts to move down. That is no mechanical compression takes place while regenerator 10 and heater 14 are heating the compressed working fluid.

The engine can be operated at minimum cycle pressures greater than atmospheric.

DESCRIPTION

FIGS. 4 to 8—First Alternate Embodiment

This invention is a two stroke regenerative, reciprocating, external combustion engine employing a regenerator 10, heater 14, and cooler 24. The first alternate embodiment of this invention employs two strokes divided into four cycles. The first cycle is the cooling cycle. The second is the compression cycle. The third is the heating cycle. And the fourth is the expansion cycle. The cooling cycle is from about 85% of the downward travel of power piston 18 to about 15% of the travel back up. The compression cycle is from about 15% of the travel back up of power piston 18 to about 85% of the upward travel of power piston 18. The heating cycle is from about 85% of the upward travel of power piston 18 to about 15% of the downward travel of power piston 18. The expansion cycle is from about top dead center to about 85% of the downward travel of power piston 18. The above positions are all estimates and are given for descriptive purposes only. The actual position, at which a part of the cycle may begin or end, may be different from those set out above. (Shaft 7, heater fluid supply pipe 28, and heater fluid exit pipe 30 can be sized such that no mechanical compression takes place during regenerative heating). The heating and expansion cycles can overlap.

The cooling cycle begins with regenerator 10, heater 14, and cooler 24 adjacent to cylinder head 4 and ends with regenerator 10, heater 14, and cooler 24 adjacent to power piston 18. During the cooling cycle, regenerator 10, heater 14, and cooler 24 move down (towards power piston 18) forcing the hot working fluid through regenerator 10, and regenerator 10 absorbs heat from the working fluid (cooling the working fluid).

The compression cycle starts with regenerator 10, heater 14, and cooler 24 close to and moving up with power piston 18 and ends with regenerator 10, heater 14, and cooler 24 moving away from power piston 18.

The heating cycle starts with regenerator 10, heater 14, and cooler 24 moving away from power piston 18 and ends with regenerator 10, heater 14, and cooler 24 adjacent to cylinder head 4. During the heating cycle regenerator 10, heater 14, and cooler 24 are moved up through the working fluid trapped between power piston 18 and cylinder head 4 and transfer heat to this working fluid (heating the working fluid). The fluids that are expected to be employed in this invention is air. However, these fluids could be gas, liquids, or mixture of gases and liquids.

Cylinder 12 is closed at one end by cylinder head 4. Cylinder 12 further contains power piston 18, which is connected to power output shaft 22 by a connecting rod 20 (for converting the linear motion of the piston to the rotating motion of the shaft). The expanding gases exert a force on power piston 18, (a cylindrical piston that can move up and down in cylinder 12). That force, exerted on power piston 18 moving it down, is transmitted via connecting rod 20 and power output shaft 22 to a load (not shown). Cylindrically shaped regenerator 10, heater 14, and cooler 24 is moved by shaft 7. Heater fluid supply pipe 28 transfers hot fluid to heater 14 from heat source 16, and heater fluid exit pipe 30 transfers spent fluid from heater 14 back to heat source 16. Cooler fluid supply pipe 32 transfers cold fluid to cooler 24 from cold source 36, and cooler fluid exit pipe 34 transfers spent fluid from cooler 24 back to cold source 36. Regenerator actuator 25 through shaft 7 moves regenerator 10, heater 14, and cooler 24. Heater fluid supply pipe 28, heater fluid exit pipe 30, cooler fluid supply pipe 32 and cooler fluid exit pipe 34 have sections that slide by one another like sections of a small telescope.

Regenerator actuator 25 moves shaft 7 with regenerator 10, heater 14, and cooler 24 attached to it between the power piston and cylinder head 4. Regenerator actuator 25, for ease of explanation, is a spring.

Regenerator actuator 25, power piston 18, and pressure forces on shaft 7 cause regenerator 10, heater 14, and cooler 24 to move back and forth (down and up) between cylinder head 4 and power piston 18 parallel to the axis of the cylinder. When regenerator 10, heater 14, and cooler 24 move up they allow working fluid to move from the space between cooler 24 and cylinder head 4 through cooler 24, heater 14, and regenerator 10 into the space below heater 14, and above power piston 18. When regenerator 10, heater 14, and cooler 24 are moving down they allow working fluid to move from the space below heater 14, and above power piston 18 through heater 14, regenerator 10, and cooler 24 into the space between cooler 24 and cylinder head 4. Regenerator 10 is made from a permeable material such that when regenerator 10 moves down and the working fluid flows through it, the material absorbs heat from the working fluid. When regenerator 10 moves up, the permeable material gives up heat to the compressed working fluid.

The means to move regenerator 10, heater 14, and cooler 24 is regenerator actuator 25, a spring, Other means can be used to move shaft 7, such as a push rod, and a rocker arm (not shown). These other means can be applied from above or below power piston 18. The means can be hydraulic, pneumatic, electrical, mechanical or any combination of them that will move the shaft 7 as required.

FIGS. 5 to 8—Operation of the First Alternate Embodiment

The engine operates as follows:

Working fluid comes from heat source 16, goes to heater 14, and returns to heat source 16 during the heating cycle. Cooler fluid comes from cold source 36, goes to cooler 24, and returns to cold source 36 during the cooling cycle.

Figure 5:
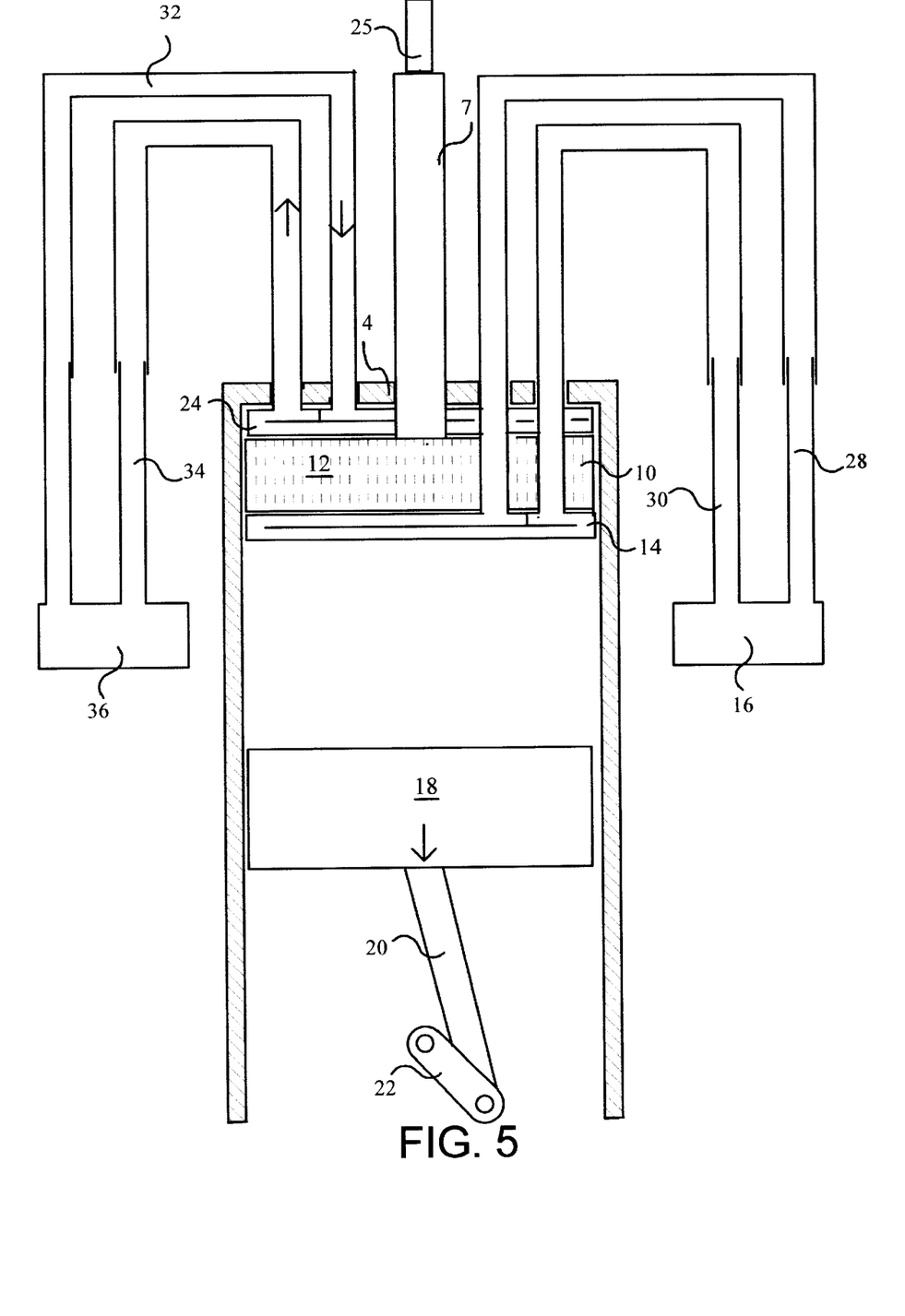
FIG. 5 shows the first alternate embodiment of a "Warren Cycle Engine" at the start of the cooling cycle.
Figure 8:
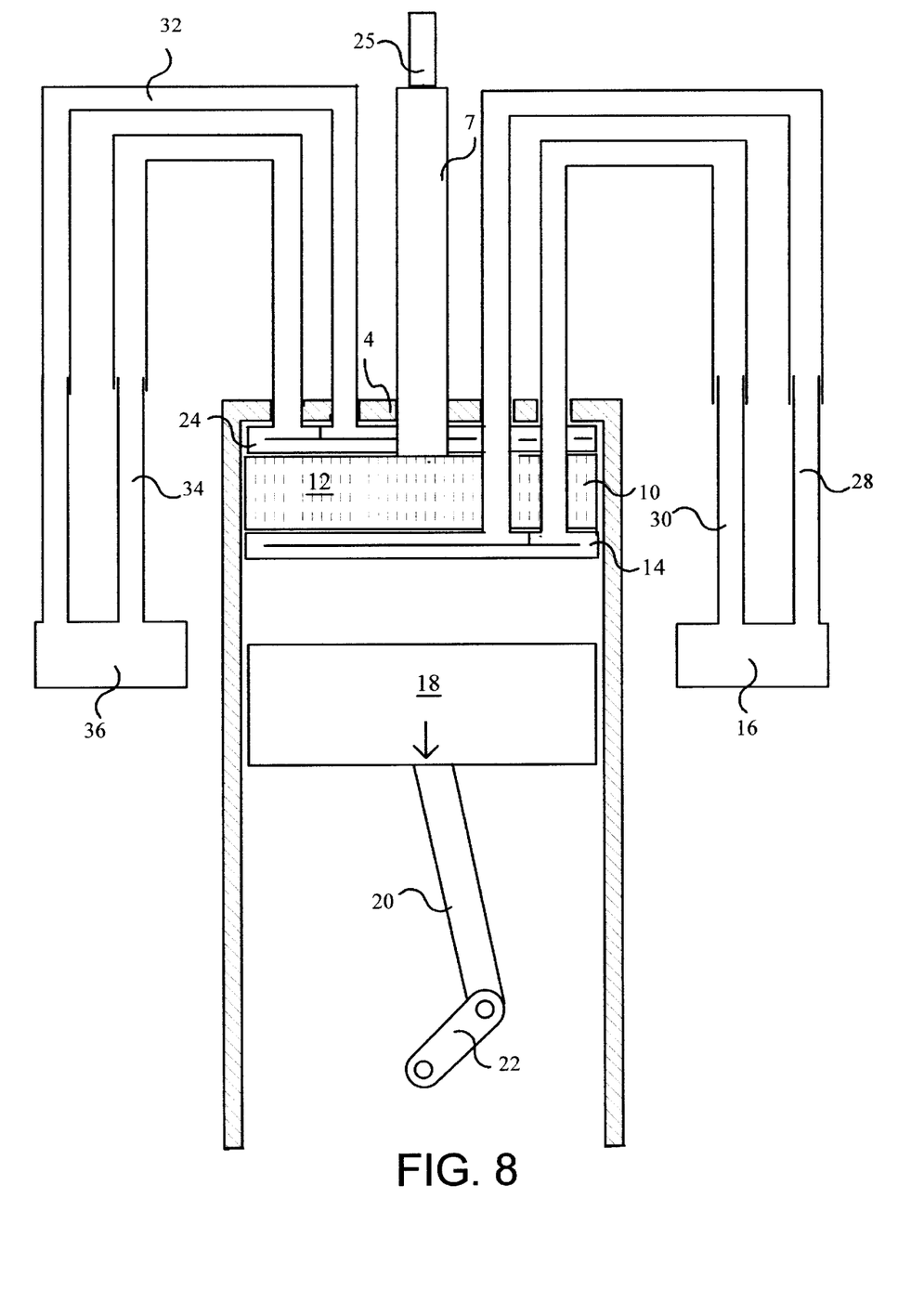
FIG. 8 shows the first alternate embodiment of a "Warren Cycle Engine" at the start of the expansion part of the cycle.

Before FIG. 5 (Between FIG. 8 and FIG. 5)

Power piston 18 is moving down as a result of pressure created by the working fluid expanding.

In FIG. 5

At about 85% of downward travel of power piston 18 pressure in cylinder 12 decreases to a point that the spring forces of regenerator actuator 25 exceed the pressure forces against the bottom of shaft 7, and regenerator actuator 25 urges shaft 7, regenerator 10, heater 14, and cooler 24 down.

Cooler fluid starts to come from cold source 36, go to cooler 24, and return cold source 36.

Figure 6:
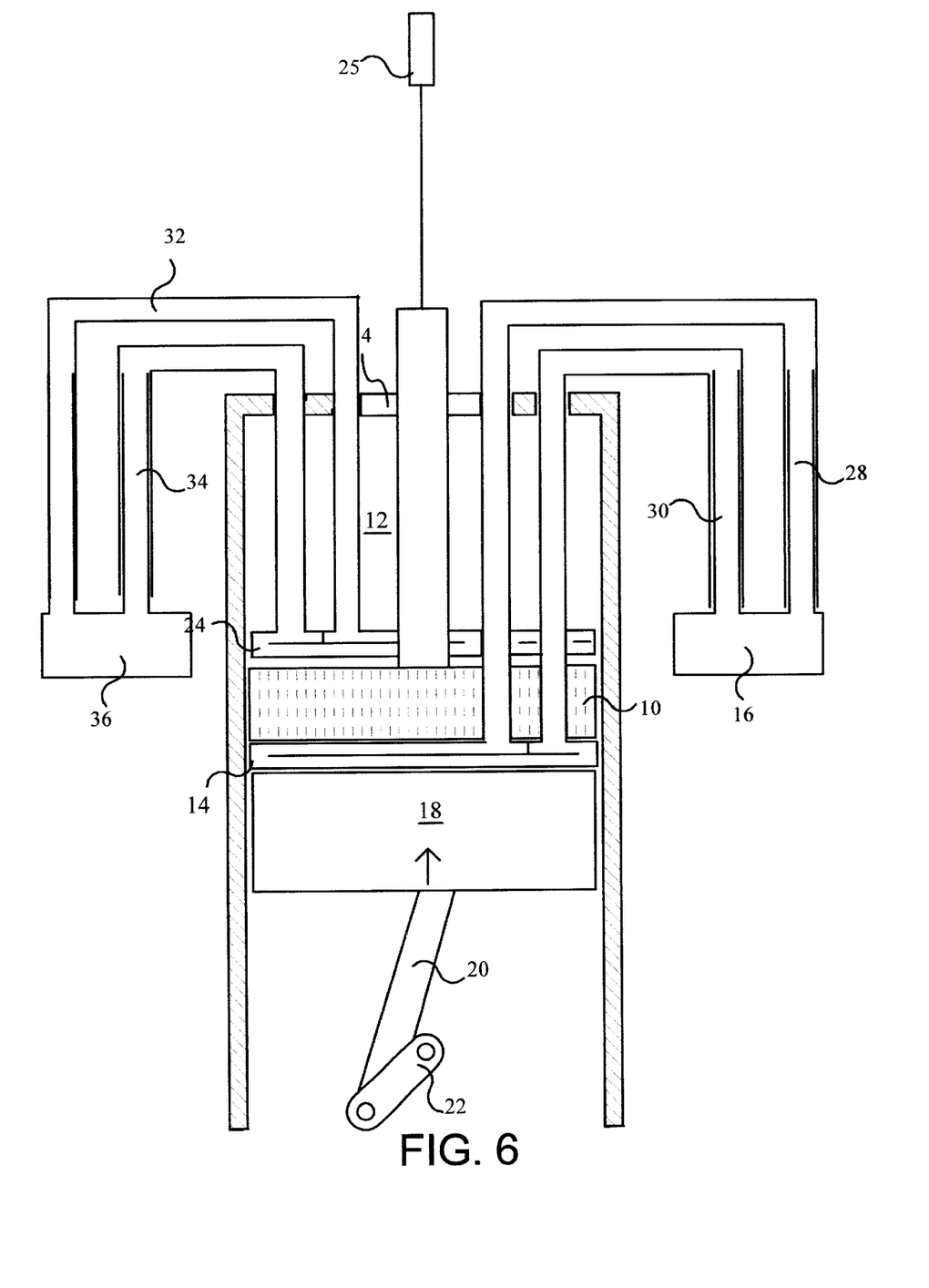
FIG. 6 shows the first alternate embodiment of a "Warren Cycle Engine" at the start of the compression cycle

Between FIG. 5 and FIG. 6

Cooler fluid comes from cold source 36, goes to cooler 24, and returns to cold source 36

Regenerator 10, heater 14, and cooler 24 move down.

The working fluid going through regenerator 10 heats up regenerator 10 and cools down the working fluid.

The working fluid going through cooler 24 is cooled by cooler 24.

Power piston 18 starts back up.

In FIG. 6

Power piston 18 and heater 14 come together.

Figure 7:
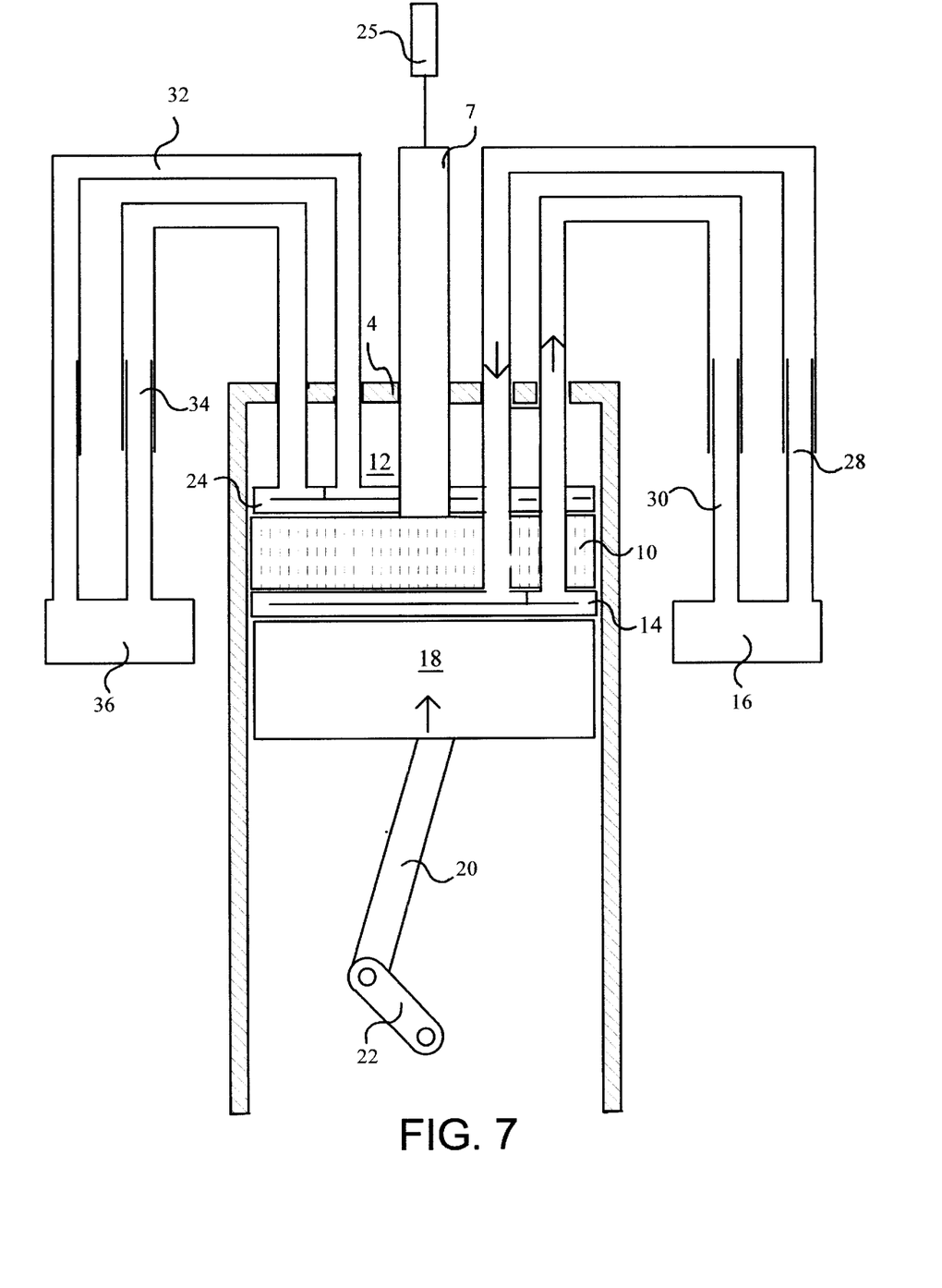
FIG. 7 shows the first alternate embodiment of a "Warren Cycle Engine" at the start of the heating cycle.

Between FIG. 6 and FIG. 7

Power piston 18 moves regenerator 10, heater 14, and cooler 24 up together.

Power piston 18 moving upwards compresses the working fluid and regenerator actuator 25.

In FIG. 7

Power piston 18 and regenerator 10, heater 14, and cooler 24 are at about 85% of the upward travel of power piston 18.

Heater fluid starts to come from heat source 16, go to heater 14, and return heat source 16.

Between FIG. 7 and FIG. 8

Heater fluid comes from heat source 16, goes to heater 14, and returns to heat source 16.

Compressed working fluid pressure acting on shaft 7 forces regenerator 10, heater 14, and cooler 24 away from power piston 18 and up against cylinder head 4.

As regenerator 10, heater 14, and cooler 24 move up toward cylinder head 4, the compressed working fluid moves through heater 14 and regenerator 10 and heats up.

In FIG. 8

Regenerator 10, heater 14, and cooler 24 are up against cylinder head 4.

Power piston 18 is moving down.

The cycle repeats.

Important Features

The volume of the working fluid between cooler 24 and cylinder head 4 can be adjusted by sizing shaft 7, heater fluid supply pipe 28, and heater fluid exit pipe 30 so that when cooler 24, regenerator 10, and heater 14 move away from power piston 18 no mechanical compression takes place even though power piston 18 continues to move up before it starts to move down. That is no mechanical compression takes place while regenerator 10 and heater 14 are heating the compressed working fluid.

The engine can be operated at minimum cycle pressures greater than atmospheric.

Conclusion

Accordingly, the reader will see that Warren Cycle Engine meets the following objects and advantages:

(a) The engine compresses the working fluid in cylinder 12, and the engine expands the working fluid in cylinder 12.

(b) Regenerator 10 saves the heat from the spent working fluid and releases the heat to the compressed working fluid.

(c) The engine has no valves.

(d) The engine has no displacer piston.

(e) The engine will operate so that the charge is almost fully expanded.

Although the description above contains much specificity, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A two stroke, external combustion, reciprocating engine having a number of similar working units, each working unit comprising:

a) a cylinder, closed at one end by a cylinder head and containing a power piston which moves in a reciprocating manner and is connected to a power output means;

b) a thermal regenerator, said regenerator being an alternating flow heat exchanger, which moves between said cylinder head and said power piston, and stores heat from working fluid as it moves towards said power piston, and releases heat to the compressed working fluid as said regenerator moves away from said power piston;

c) a heater that can move between said regenerator and said power piston.;

d) a cooler that can move between said regenerator and said cylinder head;

e) an actuator means for moving said regenerator during predetermined times during the engine's operating cycle;

f) an actuator means for moving said heater during predetermined times during the engine's operating cycle;

g) an actuator means for moving said cooler during predetermined times during the engine's operating cycle;

h) an external heat source;

i) an external cold source.

2. An engine as recited in claim 1 wherein said heat source is a solar collector.

3. An engine as recited in claim 1 wherein said heat source is a nuclear reactor.

4. An engine as recited in claim 1 wherein said heat source is the exhaust of another engine.

5. An engine as recited in claim 1 wherein said heat source is a trash burner.

6. An engine as recited in claim 1 wherein said actuator means are mechanical linkages from said power output means.

7. An engine as recited in claim 1 wherein said actuator means are electric solenoids.

8. An engine as recited in claim 1 wherein said actuator means are hydraulic or pneumatic pistons.

9. A process for operating the engine of claim 1 having the following steps:

a) As the cycle starts, said heater is being supplied heater fluid from said external heat source;

b) when said power piston is in its expansion stroke, said heater starts its downward movement, and the working fluid is forced through said heater and the working fluid heats up;

c) when said power piston is near the end of its expansion stroke, said external cold source supplies cooler fluid to said cooler;

d) when said power piston is near the end of its expansion stroke, said regenerator and said cooler start their downward movement, the spent hot working fluid is forced through said regenerator, where the working fluid cools and said regenerator heats up, the working fluid continues on through said cooler and is cooled further;

e) as said heater, regenerator, and cooler are moving down, said power piston moves through its bottom dead center position and starts back up;

f) when said heater and said power piston meet, said heater, regenerator, and cooler reverse to an upward movement;

g) said cooler moves up toward said cylinder head;

h) said cooler moves upward, and the hot working fluid is forced through said cooler and the working fluid cools;

i) said power piston, said heater, and said regenerator move up toward said cylinder head, and compress the working fluid trapped in said cylinder;

j) at about 85% of the upward movement of said power piston; said external heat source supplies heat to said heater;

k) at about 85% of the upward movement of said power piston; said heater, and regenerator move away from their position adjacent to said power piston and move toward said cylinder head;

l) as said heater, and regenerator move up toward said cooler, said compressed working fluid moves through said heater and said regenerator, said working fluid is heated, and said regenerator is cooled;

m) the space between said heater, and said power piston continues to be heated as said power piston moves away from said cylinder head in said power piston's expansion stroke;

n) the process repeats.

10. A two stroke, external combustion, reciprocating engine having a number of similar working units, each working unit comprising:

a) a cylinder, closed at one end by a cylinder head and containing a power piston which moves in a reciprocating manner and is connected to a power output means;

j) a regenerator, said regenerator being an alternating flow heat exchanger, which moves between said cylinder head and said power piston, and stores heat from working fluid as it moves towards said power piston, and releases heat to the compressed working fluid as said regenerator moves away from said power piston;

k) a heater attached to said regenerator, between said regenerator and said power piston;

l) a cooler attached to said regenerator, between said regenerator and said cylinder head;

m) an actuator means for moving said regenerator during predetermined times during the engine's operating cycle;

n) an external heat source;

o) an external cold source.

11. An engine as recited in claim 10 wherein said heat source is a solar collector.

12. An engine as recited in claim 10 wherein said heat source is a nuclear reactor.

13. An engine as recited in claim 10 wherein said heat source is the exhaust of another engine.

14. An engine as recited in claim 10 wherein said actuator means is a spring.

15. An engine as recited in claim 10 wherein said actuator means is mechanical linkage from said power output means.

16. An engine as recited in claim 1 wherein said actuator means is an electric solenoid.

17. An engine as recited in claim 1 wherein said actuator means is hydraulic or pneumatic piston.

18. A process for operating the engine of claim 10 having the following steps:

a) when said power piston is near the end of its expansion stroke, said external cold source supplies cooler fluid to said cooler b) when said power piston is near the end of its expansion stroke, said heater, said regenerator and said cooler start their downward movement, the spent hot working fluid is forced through said regenerator, where the working fluid cools and said regenerator heats up, the working fluid continues on through said cooler and is cooled further;

c) as said heater, regenerator, and cooler are moving down, said power piston moves through its bottom dead center position and starts back up;

d) when said heater and said power piston meet, said heater, regenerator, and cooler reverse to an upward movement;

e) said power piston, said heater, said regenerator, and said cooler move up toward said cylinder head, and compress said working fluid trapped in said cylinder;

f) at about 85% of the upward movement of said power piston; said external heat source supplies heat to said heater;

g) at about 85% of the upward movement of said power piston; said heater, said regenerator and said cooler move away from their position adjacent to said power piston and move toward said cylinder head;

h) as said heater, said regenerator, and said cooler move up toward said cylinder head, said compressed working fluid moves through said heater and said regenerator, said working fluid is heated, and said regenerator is cooled;

i) when said heater, said regenerator, and said cooler are near said cylinder head, said external heat source stops supplying heating fluid;

j) said power piston moves down supplying power output;

k) the process repeats.

19. An engine as recited in claim 1 whose minimum internal pressure is greater than atmosphere.

20. An engine as recited in claim 10 whose minimum internal pressure is greater than atmosphere.

* * * * *